United States Patent [19]

Dillon et al.

[11] 4,148,059
[45] Apr. 3, 1979

[54] SIGNAL PROCESSING FOR DISCRETE-SAMPLE-TYPE-COLOR-VIDEO SIGNAL

[75] Inventors: Peter L. P. Dillon, Pittsford; Bryce E. Bayer, Greece, both of N.Y.

[73] Assignee: Eastman Kodak Company, Rochester, N.Y.

[21] Appl. No.: 840,877

[22] Filed: Oct. 11, 1977

Related U.S. Application Data

[63] Continuation-in-part of Ser. No. 685,824, May 12, 1976, and a continuation-in-part of Ser. No. 813,377, Jul. 6, 1977.

[51] Int. Cl.² ............................................. H04N 5/14
[52] U.S. Cl. ...................................................... 358/37
[58] Field of Search .................................. 358/37, 162

[56] References Cited

U.S. PATENT DOCUMENTS

| | | | |
|---|---|---|---|
| 3,789,133 | 1/1974 | Kline | 358/37 |
| 3,995,108 | 11/1976 | Morrison | 358/162 |

*Primary Examiner*—Richard Murray
*Attorney, Agent, or Firm*—Thomas H. Close

[57] ABSTRACT

Processing circuitry for discrete-sample-type-color-video signals provides signal enhancement by algebraically summing properly weighted delayed, doubly delayed, and undelayed versions of the same signal.

8 Claims, 8 Drawing Figures

COLOR DEMULTIPLEXER

G = GREEN
R = RED
B = BLUE

SIGNAL PROCESSING FOR DISCRETE-SAMPLE-TYPE-COLOR-VIDEO SIGNAL

CROSS-REFERENCE TO RELATED APPLICATIONS

This application is a continuation-in-part of commonly assigned, copending U.S. Pat. application Ser. No. 685,824, filed in the name of Peter L. P. Dillon on May 12, 1976 and to U.S. Pat. application Ser. No. 813,377, filed in the names of Peter L. P. Dillon and Bryce E. Bayer, On July 6, 1977; filing priority of which is claimed herein under 35 USC 120.

BACKGROUND OF THE INVENTION

Field of the Invention

The invention relates to processing circuitry for discrete-sample-type-color-video signals and more particularly to such circuitry which reduces artifacts of sampling and improves, at least apparently, the image detail of images resulting from such video signals.

Description Relative to the Prior Art

The conversion of a color image to an electrical signal representation by a color video imager typically involves either an elemental spot that scans continuously along a raster pattern or a grid of elemental areas that detect image information. In either case, the finite character of the sensing aperture results in a loss of image information. Because the image information that is successfully extracted by an imaging device is typically rather limiting, specialized signal processing techniques are employed to maintain and to enhance, insofar as is possible, the quality of image representation.

For example, when image-representative signals are generated using a line scan process, as in a vidicon, it is known that certain degradation occurs as a result of the finite diameter of the scanning beam. Considering as an example a vertical edge in an image, only the leading portion of the beam initially "sees" the edge. Eventually the entire beam sweeps past the edge and is influenced by the edge transition. As a consequence of such operation, an abrupt edge transition tends to have a gradual influence on the scanning beam and, in effect, the edge is blurred. A somewhat similar effect, it will be appreciated, results with any image detail in the size range of the scanning beam.

To counteract this blurring effect, various "aperture correction circuits" (see e.g. U.S. Pat. No. 3,789,133) have been developed which function to amplify selectively high frequency scene information. By such boosting of high frequencies, these correction circuits reduce the undesirble loss of sharpness, albeit with some risk of amplifying noise inherent in the scanning device. It is also known in image signal processing that the green signal is closely related to the luminance response of the human visual system and may be aperture corrected, and used as the sole source of information regarding high-spatial-frequency image detail (see U.S. Pat. No. 3,732,360).

While such aperture correction techniques have been effective in upgrading the image-representative signals in line-scan-type systems such as single- and multi-tube color vidicons, they encounter problems when applied to the signals of elemental-area-type imagers, such as charge-transfer imaging devices, where image information is extracted as discrete samples. Such imagers provide discrete "updates", typically along respective element rows, rather than provide continuous line scan signals. The contrast in signal characteristics is ever more significant where color imaging is performed on a "single chip" (see U.S. Pat. No. 3,971,065 and "Integral Color Filter Arrays for Solid State Imagers", Dillon et al, IEEE Int'l. Elec. Dev. Mtg. Conference Papers, Washington, D.C., 1976), because signal updates are staggered among the colors, and even the sampling frequency may vary with color.

As a result of the discrete sampling of such solid-state imagers, the color signals tend to exhibit sharp transitions at the boundaries of picture elements and mere amplification of high frequencies would only serve to worsen the artifacts of discrete sampling. Hence, known aperture correction techniques are not directly applicable to discrete area imaging devices and only tend to degrade the signals from such devices.

Video signal processing apparatus according to the teaching of copending application Ser. No. 813,377, interpolates to define intermediate levels between adjacent "updating events" (e.g. between successive green sample levels derived along a row of imager elements) of a discretely-updated color signal, such interpolation being preferably performed across a row by integrating differences between adjacent signal levels. Such integration is preferably implemented on a continuous basis by delaying the color signal for a sample period, subtracting the delayed signal from an undelayed version of that same color signal, and then integrating the resulting difference signal. By so modifying a discretely-updated color signal, a generally continuous signal is produced for which the artifacts resulting from sampling discontinuities prove to be significantly less noticeable. Furthermore, the preferred type of interpolation, which is essentially a linear interpolation, is more conservative of image detail than would be mere smoothing of the signal by more conventional low pass filtering. To improve the representation of high frequency image detail, the signal for the primary color corresponding most closely to the luminance response characateristic of the human visual system, green — for a green, red and blue set of primary colors — is first processed to produce a slow-changing version corresponding to a fraction of the actual sampling rate (e.g. samples are alternately omitted). The fraction is preferably chosen to match the frequency range of the "slow" green signal to that for the red and blue signals. Such slow green signal, in interpolated form is then differenced from an interpolated version of the full sampling rate signal for that color to produce a signal for representing high frequency luminance detail. This "high frequency luminance" difference signal is then added to each of the interpolated signals for the various primary colors to produce an augmented set of generally continuous primary color signals. By so producing the augmented signals, high frequency detail is retained but is effectively driven to neutral so that color banding problems are not introduced at sharp image transitions. Thus, it is possible to render an edge accurately in a neutral monochrome with less high frequency information than would be necessary to render the same edge in color and human eye response is such that the difference is typically not noticeable.

In one implementation of copending application Ser. No. 813,377, green image detail is, on average, sampled at twice the rate of red or blue (i.e. in the incoming video signal green is updated twice as frequently as red and blue; see U.S. Patent Application Ser. No. 685,824 filed May 12, 1976). Two slow green signals are generated by omitting signal updates on an alternating basis. These slow green signals are interpolated and then averaged to provide a signal representative of low-frequency green image information. The averaged slow green signal is then differenced from an interpolated full-sampling-rate green signal to provide a signal representative of high frequency luminance, which is added to interpolated versions of the red and blue signals, and to the averaged slow green signal. Hence, for improved representation of detail as mentioned above, the high frequency information for all three color signals is derived from the same set of samples... the green samples which correspond to the highest individual color sampling rate, and hence the broadest bandwidth image information.

SUMMARY OF THE INVENTION

In cooperation with apparatus for producing a discrete-sample-type color video signal, apparatus embodying the invention provides enhancement of a high resolution green signal by use of selectively delayed, and suitably weighted, versions of such green signal, the enhancement serving to sharpen the appearance of edges in scenes corresponding to such video signals.

The invention will now be described in detail with reference to the drawings wherein.

Figure 3:
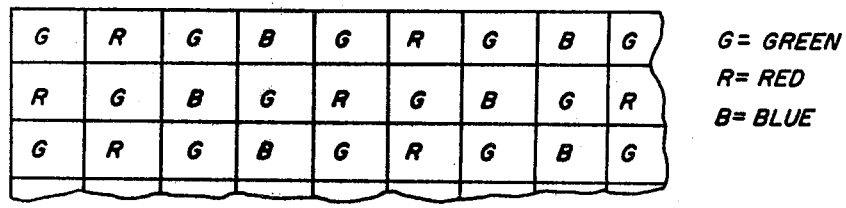
Figure 5A:
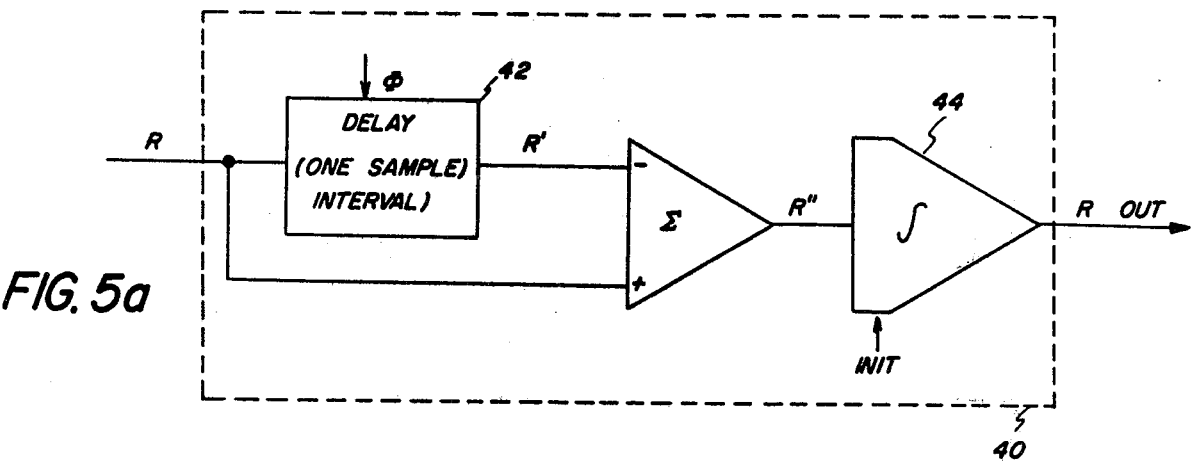
Figure 5B:
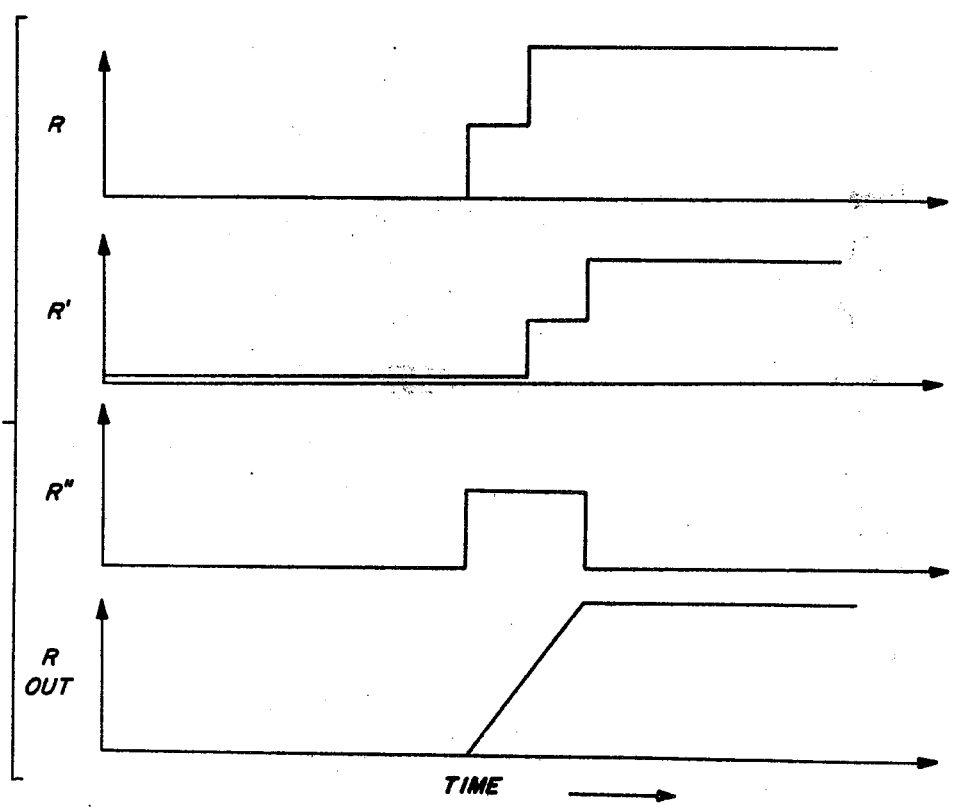
Figure 4:
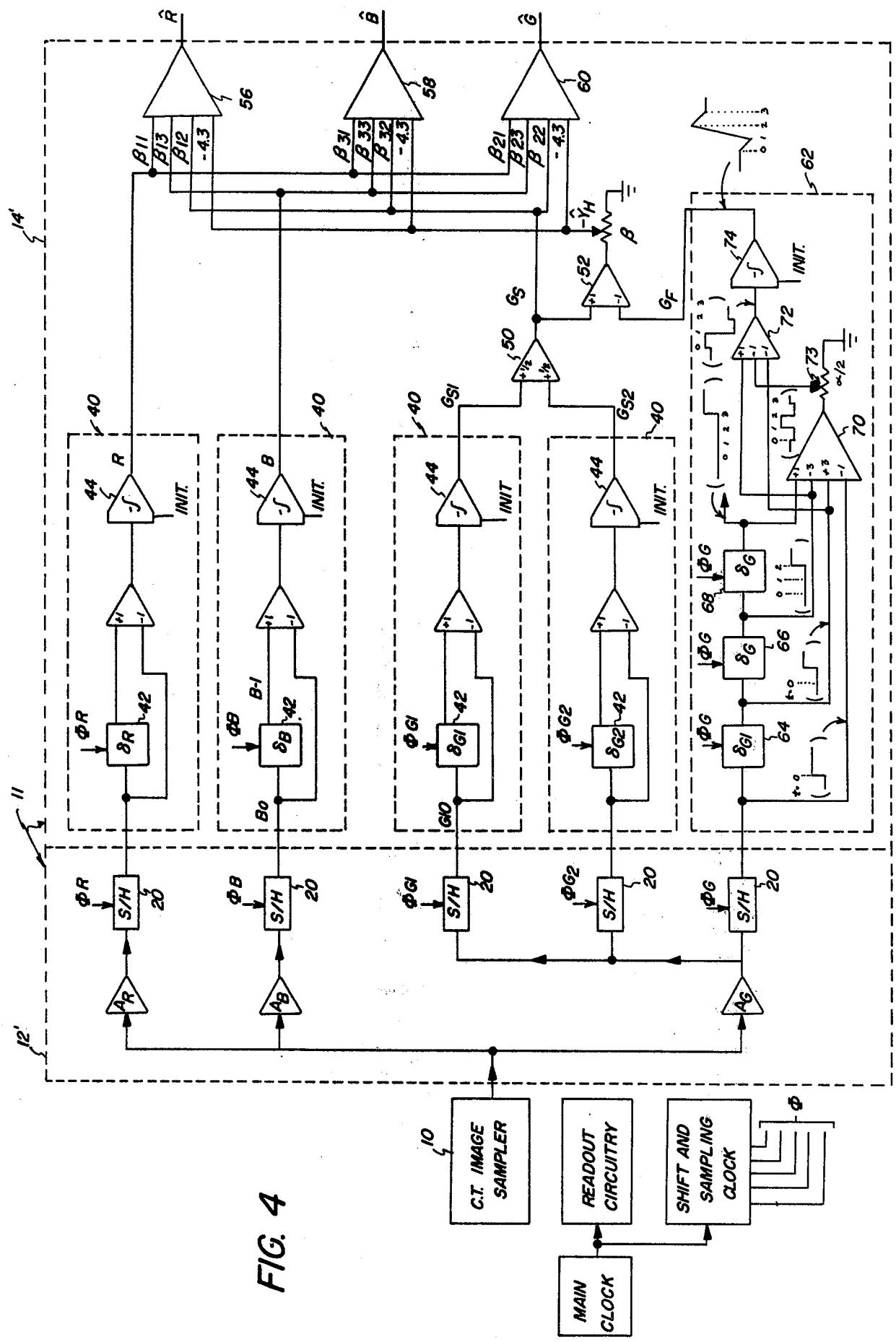
Figure 6:
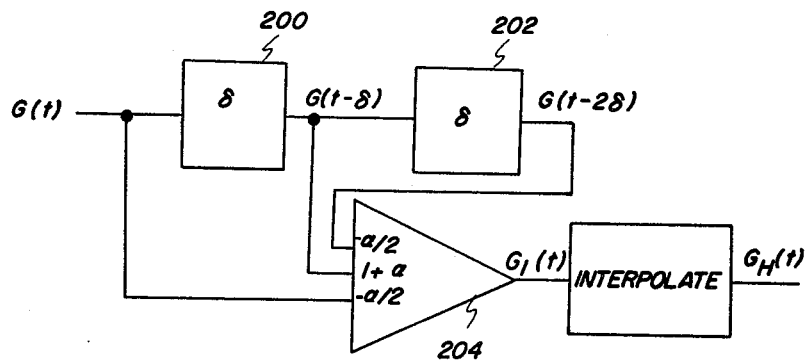

FIG. 3 indicates a presently preferred color sampling pattern of an elemental area imager (image sampler for use with the invention;

FIG. 4 is a diagram in block form of a presently preferred signal processing apparatus;

FIG. 5A is a block diagram of an interpolator circuit useful in practicing the invention;

FIG. 5B is a set of graphical representations indicating the operation of an interpolator circuit as in FIG. 5A;

FIG. 6 is a block diagram of apparatus according to the invention; and

Figure 7:
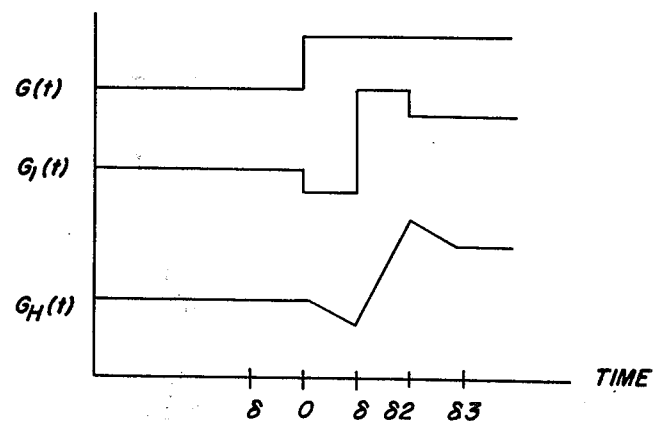

FIG. 7 depicts a set of diagrams useful in understanding the operation of apparatus according to the invention.

Figure 1:
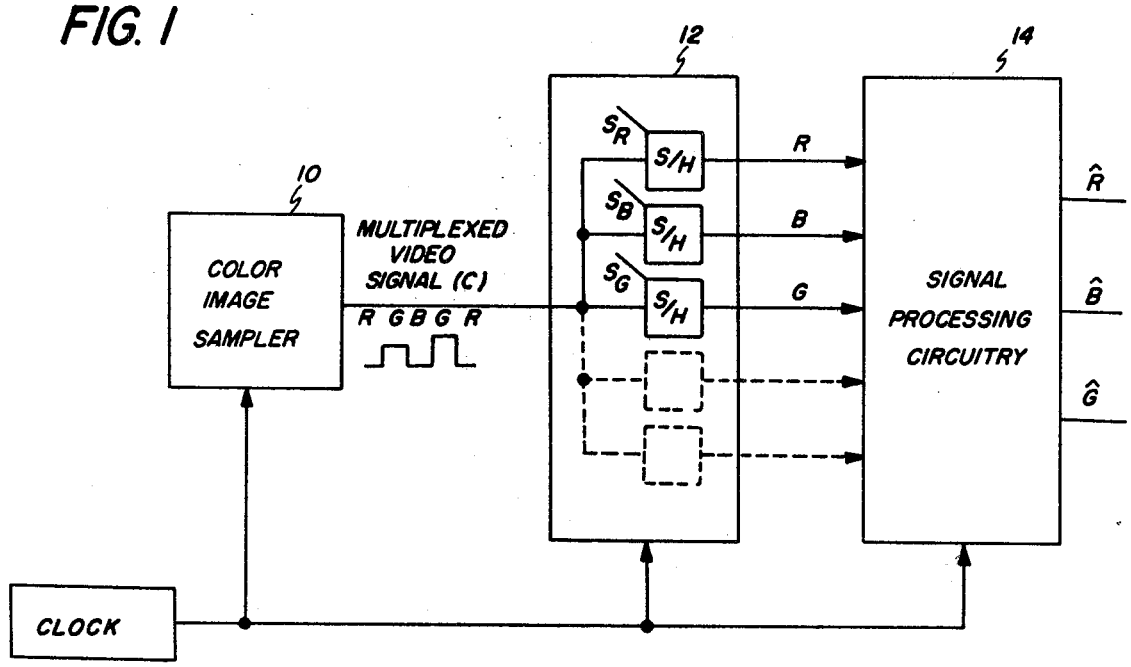
FIG. 1 is a simplified block diagram illustrating signal processing of apparatus with which the invention is practicable.
Figure 2:
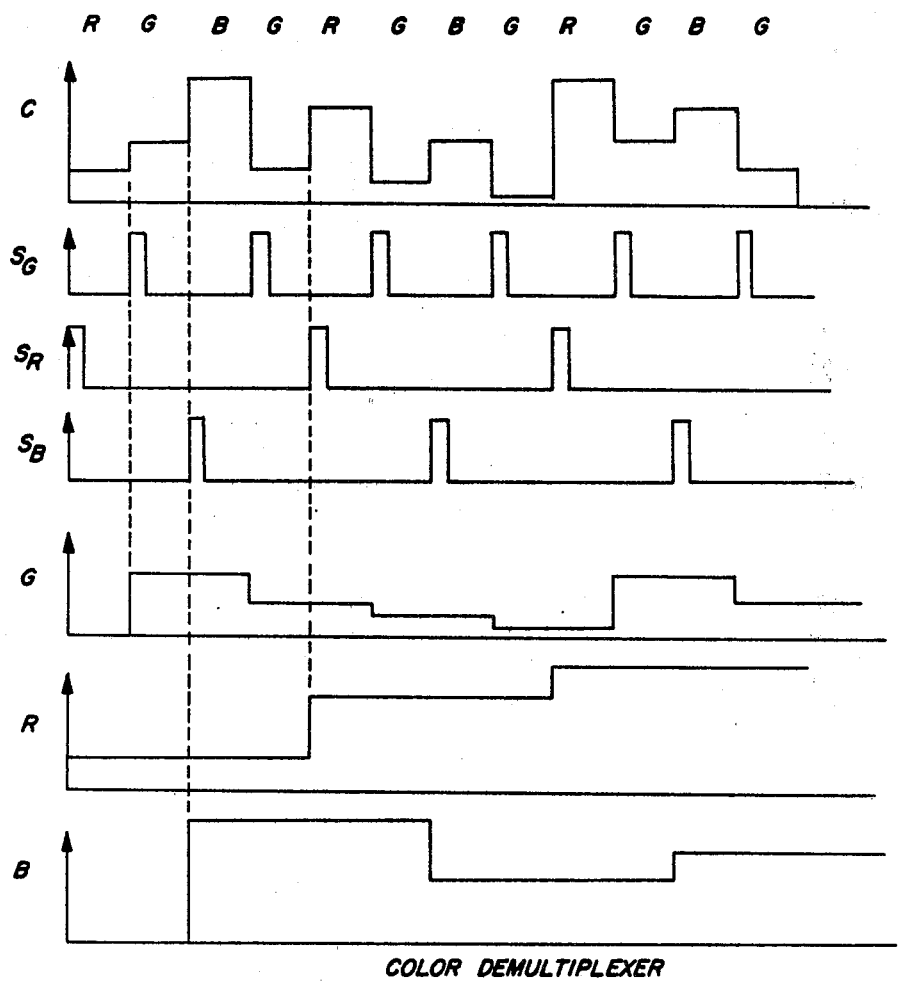
FIG. 2 is a timing diagram indicating the operation of a demultiplexer used in conjunction with the apparatus of FIG. 1.

Referring to FIG. 1 for a simplified overview of a progression of video signal modifications according to the invention, a discrete area image sampler 10, which may for example, include one or more charge-transfer-type imagers, produces a video signal set c. Assuming, as is presently preferred, a time-division-multiplexed set of signals for green, red, and blue (denoted G, R and B, respectively) a demultiplexer 12 is employed to produce individual pulse or "box car" type signals for such colors (dashed lines serve to indicate additional channels for "partial sample population demultiplexing" as is discussed below). The demultiplexer may comprise a series of sample-and-hold circuits as is well known; and a simplified timing diagram for such circuits as indicated in FIG. 2, $S_G$, $S_R$, $S_B$ denoting "sample green", "sample red", and "sample blue", etc. The separated color signals (see the last three plots of FIG. 2) are supplied to a signal processor 14 where the signals are modified to afford improved image representation. A preferred imager sampling pattern for use in providing the video signal set c is indicated in FIG. 3. Such pattern, it should be noted, includes green elements at twice the rate of red or blue elements, a technique for exploiting the resulting nonuniform color sample rates being explained below.

Referring to FIG. 4, a signal processing apparatus 11 cooperates with an image sampler 10 (see FIG. 3) which produces a time-division-multiplexed signal having green, red and blue image sample information intermixed.

A demultiplexer 12' (primes are used to indicate particular implementations of elements already discussed generally) receives the image sample signal and using sample-and-hold circuits 20 generates a set of discrete-time color signals. In this implementation, five such color signals are produced: a full green signal based on all of the green samples ($G_F$); a red signal based on all of the red samples (R); a blue signal based on all of the blue samples (B); a first slow green signal based on every other green sample ($G_{S1}$); and a second slow green signal ($G_{S2}$) based on the green samples omitted for the first slow green signal. Synchronization of the sampling is achieved using clocking pulses along the lines indicated in FIG. 2.

The discrete-time color signals are supplied to a signal processing circuit 14' which produces output color signals $\hat{R}$, $\hat{B}$, and $\hat{G}$. Signals upgrading by means of an interpolation process is preferably performed by integrating differences between adjacent samples for the respective discrete color signals as mentioned above. It is contemplated, however, that a higher order interpolation may be employed to advantage. An interpolating apparatus 40 is included in each of the signal channels except the full green channel where interpolation is combined with the invention as is discussed below. A presently preferred form for apparatus 40 (see FIG. 5A) utilizes a delay device 42, the delay (denoted $a$) of which corresponds to the period for the respective discrete-time color signal. An analog shift register may be used for the delay device 42 and a clocking signal input $\Phi$ has accordingly been indicated.

An integrator 44 produces a signal representing the integrated difference between the delayed and a relatively undelayed version of the discrete-time color signal. At the end of each row of signal image information, the integrator 44 is initialized to a zero level. By integrating sample-to-sample differences along a row in this manner the output signal of integrator 44 is caused to represent a first order linear interpolation between color sample levels (see FIG. 5B).

The slow green signals $G_{S1}$ and $G_{S2}$ are averaged at a summing device 50 and the average slow green signal is differenced from the full green signal $G_F$ at a summing device 52 to produce a signal $\hat{Y}_H$ for representing high-frequency luminance. Such signal ($\hat{Y}_H$) is added to the red and blue and slow green signals at summers 56, 58 and 60, respectively. By sampling green (the primary color most like luminance) at a higher rate, as was mentioned above, a detailed high frequency luminance signal is provided for addition to all three primary color signals. It will be appreciated that for the high frequency component of all three color signals the highest sampling rate information is used whereas the low sampling rate information for the respective colors is used to develop the low frequency color signal components.

By adding the luminance signal to all three color signals and hence driving the high frequency detail to be neutral, undesirable color banding effects at edges are reduced or obviated as was mentioned above. While the full green channel might have been used as the output signal Ĝ, the use of the summer 60 advantageously facilitates the introduction of color matrixing at the bank of summers 56, 58, 60, matrixing coefficients (β) being indicated for the signal inputs to those summers.

In one embodiment of the invention the full-green signal is made more effective as the signal for representing high frequency detail by producing a weighted average of adjacent samples. An enhancement circuit 62 according to the invention incorporates an interpolation of the type provided by the apparatus 40 discussed above and is indicated in the full-green signal channel in FIG. 4. Preferred enhancement circuitry includes delays 64, 66 and 68 which are matched to the sampling period for the full green signal. (Again, analog shift registers may be used to provide the delays and clocking signals Φ have been indicated.) The objective of processing by the circuit 62 is to modify the relatively undelayed signal and the doubly delayed signal by a weighting coefficient $-\alpha/2$ and to modify the single delayed signal by $1+\alpha$. Such weighting coefficient $\alpha$ is empirically chosen to provide the best apparent picture quality. See FIG. 6 (and the waveform diagrams of FIG. 7) for a ready comprehension of the enhancement concept of the invention, the delay devices 200, 202 thereof cooperating with a summing amplifier 204 adapted to provide the coefficients $-\alpha/2$ and $1+\alpha$. In the presently preferred implementation of the invention, FIG. 4, a weighting of adjacent samples to enhance high frequencies and an interpolation (along the lines provided by the circuit 40) are "combined" in the circuit 62 using the gains shown at a summing device 70 and a summing device 72, in conjunction with the scaling of a potentiometer 73. The output of device 72 is supplied to an integrator 74 which produces the enhanced full-green signal. The preferred configuration for circuit 62 has the special advantage of concentrating adjustment of the empirical coefficient $\alpha$ at a single point, namely the potentiometer. Regardless of whether the interpolation and enhancement are "combined", as in FIG. 4, or separately implemented, it will be appreciated that the heart of the enhancement process is the algebraic summing of a delayed signal with both a signal of longer delay and with an undelayed signal. In this regard, it will be further appreciated, from the waveforms associated with the leads of FIG. 4, that the signal appearing at the output of the summing amplifier 52 is enhanced to the form depicted in the third plot of FIG. 7, . . . the output of the FIG. 4 summing circuit 72 being as shown when $\alpha=1$.

The invention has been described in detail with reference to the figures; however, it will be appreciated that variations and modifications are possible which are within the spirit and scope of the invention.

What is claimed is:

1. In combination:
   (A) an imaging device of the type adapted to produce discrete sample type signals corresponding to images;
   (B) processing means for receiving signals produced by said imaging device for time delaying said signals by a first amount and by a second longer amount; and
   (C) signal combining means adapted to receive the undelayed signals which are applied to said processing means and the signals which are delayed by said first and second amounts, the signal combining means being adapted to produce resultant signals representing the difference between the sum of said undelayed signal and the signal which is delayed by said second amount, and the signal which is delayed by said first amount, said resultant signals being enhanced versions of the signals corresponding to said images, said processing means being adapted to provide delays of first and second durations which correspond, respectively, to the duration of one sampling period and to two sampling periods of said imaging device.

2. The apparatus of claim 1 wherein said signal combining means is adapted to provide greater gain to the signals delayed by said first amount than to the other signals applied thereto.

3. In combination:
   (A) means for producing discrete-sample-type signals corresponding at least in part to the luminance detail information of a scene, said signals occurring at a predetermined sample rate; and
   (B) means for so processing said signals that a step change in the luminance detail of said scene causes an increase and decrease in the amplitude of, respectively, signals corresponding to the luminance level at adjacent, but opposite, sides of the luminance step change, said processing means comprising:
      (a) means adapted to receive said signals for time delaying said signals by a first and by a second longer amount, and
      (b) means adapted to receive the undelayed signals and said delayed signals for algebraically summing said undelayed signals and said longer delayed signals, and for differencing the sum signals so produced from the signals which are delayed by said first amount, thereby to produce a resultant luminance signal having enhanced luminance detial, said means for time delaying said signals by first and second amounts being adapted, respectively, to delay said signals for the durations of one and two sampling periods.

4. Apparatus of claim 3 wherein said means for time delaying said signals by first and second amounts are adapted, respectively, to delay said signals for a first and second multiple of the signal sample period.

5. The apparatus of claim 3 including means cooperative with said processing means for increasing the gain of signals time delayed by said first amount relative to the gain of said undelayed signals and said signals which are time delayed by said second amount.

6. Apparatus of claim 3 wherein said means for producing discrete sample type signals is adapted to produce green sample signals.

7. In video apparatus having a color image sensor for generating a color video signal characterized by a succession of periodically updated signal levels representing successive red, green and blue color samples of an image, the green samples occurring more frequently than red or blue samples in the signal and being comprised of samples occurring at odd and even sample times, said video signal processing apparatus comprising:
   (A) means for separating the color video signal into a set of discrete-time-color signals representing, respectively, all of the green samples, all of the red samples, all of the blue samples, the even green samples, and the odd green samples;

(B) interpolating means responsive to the red, blue, even green, and odd green sample signals for producing smoothly varying red, blue, even green, and odd green signals;

(C) enhancement and interpolating means responsive to the signal representing all of the green samples for producing an enhanced, smoothly varying full green signal, said enhancement and interpolating means having (a) delay means responsive to the signal representing all of the green samples for producing a first delayed green sample signal, delayed by one green sample period, and a second delayed green sample signal, delayed by two green sample periods, (b) means for subtracting the product of the sum of said undelayed green sample signal and said second delayed green sample signal, and a first constant from the product of said first delayed green sample signal and a second constant greater than said first constant, thereby to produce an enhanced green sample signal, and (c) interpolating means responsive to said enhanced green sample signal for producing a smoothly varying enhanced full green signal;

(D) means for averaging said smoothly varying even green signal and said smoothly varying odd green signal for producing an averaged green signal;

(E) means for producing the difference between said smoothly varying enhanced green signal and said averaged green signal to produce an enhanced high frequency luminance signal; and (F) matrix means for adding said enhanced high frequency luminance signal to, respectively, said smoothly varying red, blue and averaged green signals in preselected proportions to produce a set of improved red, blue and green color video signals.

8. The invention claimed in claim 7 wherein said enhancement and interpolating means comprises:

(A) first, second, and third delay devices adapted to receive a discrete-sample-type signal as an input and to produce, as an output, the input signal delayed by one sample period, the input of the first delay device being connected to receive said signal representing all of said green samples, the input of the second delay device being connected to the output of said first delay device and the input of the third delay device being connected to the output of said second delay device;

(B) first summing means having first, second, third and fourth inputs weighted by suitable factors and to which are respectively supplied the output of said third delay device, the output of said second delay device, the output of said first delay device, and said signal representing all of said green samples, said first summing means having an output for supplying the weighted sum of said inputs;

(C) potentiometer means having an input and a positionable wiper, the input of said potentiometer being connected to the output of said summing means;

(D) second summing means having first, second and third inputs weighted by suitable factors and to which are applied, respectively, the output of said second delay device, the signal on the wiper of said potentiometer, and the output of said first delay device, said second summing means having an output for supplying the weighted sum of said inputs; and (E) interpolating means, having an input for receiving the output of said second summing means and an output, for producing said enhanced, smoothly varying full green signal.

* * * * *